United States Patent [19]
Nishimura et al.

[11] Patent Number: 6,165,645
[45] Date of Patent: *Dec. 26, 2000

[54] POLYMER ELECTROLYTE AND LITHIUM POLYMER BATTERY USING THE SAME

[75] Inventors: Ken Nishimura; Masahiko Ogawa; Akiko Ishida, all of Moriguchi; Nobuo Eda, Hirakata, all of Japan

[73] Assignee: Matsushita Electric Industrial Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/715,261

[22] Filed: Sep. 16, 1996

[30] Foreign Application Priority Data

Sep. 29, 1995 [JP] Japan ................... 7-252745

[51] Int. Cl.⁷ .................................. H01M 10/40
[52] U.S. Cl. ........................ 429/303; 429/218.1
[58] Field of Search ................... 429/190, 300, 429/303, 218.1

[56] References Cited

U.S. PATENT DOCUMENTS

| | | |
|---|---|---|
| 5,296,318 | 3/1994 | Gozdz et al. |
| 5,639,573 | 6/1997 | Oliver et al. ............ 429/190 |
| 5,658,685 | 8/1997 | Oliver ...................... 429/190 |

FOREIGN PATENT DOCUMENTS

| | | |
|---|---|---|
| 0 555 114 A1 | 8/1993 | European Pat. Off. |
| 61-23947 | 6/1986 | Japan. |

OTHER PUBLICATIONS

Wha–Tzong Whang et al., "Effects of Polymer Matrix and Salt Concentration on the Ionic Conductivity of Plasticized Polymer Electrolytes," Journal of Applied Polymer Science, vol. 56, No. 12, Jun. 20, 1995, pp. 1635–1643, 000541055.

*Primary Examiner*—John S. Maples
*Attorney, Agent, or Firm*—Akin, Gump, Strauss, Hauer & Feld, L.L.P.

[57] ABSTRACT

A gelled polymer electrolyte having a high mechanical strength and a high ion conductivity and a lithium polymer battery using the same electrolyte are disclosed. The gelled polymer electrolyte comprises a polymer alloy and an organic electrolyte solution, wherein the polymer alloy includes a polymer which is hardly soluble in the organic electrolyte solution and another polymer which is soluble in the organic electrolyte solution. The lithium polymer battery comprises a negative electrode including metallic lithium, a lithium alloy, carbon or an inorganic compound, and a positive electrode including an active material of a metal oxide capable of intercalating and deintercalating lithium in a reversible manner, such as $LiCoO_2$, $LiNiO_2$ or the like, and the gelled polymer electrolyte placed between both electrodes.

6 Claims, 2 Drawing Sheets

POLYMER ELECTROLYTE AND LITHIUM POLYMER BATTERY USING THE SAME

BACKGROUND OF THE INVENTION

1. Field of the Invention

The present invention relates to a polymer electrolyte and a lithium polymer battery using the same.

2. Description of the Prior Art

Lithium secondary batteries characterized by their high voltage and high energy density are highly promising as the new-type secondary batteries of the next generation, and therefore, vigorous researches and developments directed to their improvements are under progress. In an attempt to improve their ionic conductivity and decomposition voltage, electrolytes for the lithium secondary batteries have also been briskly developed.

An organic electrolyte solution (wherein cations and/or anions are dissolved in an organic solvent) is employed in most of the lithium secondary batteries including the lithium ion secondary battery. In practical batteries, a separator in a shape of porous membrane made of polypropylene or the like is impregnated with the organic electrolyte solution, thereby to secure ion-conductive channels across the positive electrode and the negative electrode.

The conventional lithium secondary batteries frequently have the problems of internal short-circuiting due to formation of lithium dendrites, and it is difficult to control the formation, particularly in a system using the organic electrolyte solution. The organic electrolyte solution is a fluid and thus cannot suppress the growth of dendrites.

If a separator is used, a current flow passing across the positive electrode and the negative electrode concentrates on the microporous portions of the separator which are offered for limited ion-conductive channels. As a result, the growth of lithium dendrites is promoted intensively on the microporous portions of the separator.

In order to break through these situations, a battery system utilizing a solid polymer electrolyte has been proposed and is now under development. Such polymer electrolyte is an ionic conductor which has metal salts dissolved homogeneously. This functions as a solid electrolyte in a separator-free battery, and thus can suppress the formation and the growth of lithium dendrites effectively because the current flows across both electrodes uniformly over the entire surface of the polymer electrolyte.

The ionic conductivity of the polymer electrolyte is however about $10^{-5}$ S/cm at room temperature which is lower than that of any organic electrolyte solution by 100 times or more. The low ionic conductivity is a main factor responsible for disturbing the practical introduction of the polymer electrolyte into the commercial secondary batteries, and thus the research and development are now directed to the improvement of this low conductivity.

Under these circumstances, in an attempt to secure an ionic conductivity of the same degree as that of the organic electrolyte solution, the development of a gelled polymer electrolyte has been promoted. The gelled polymer electrolyte is prepared by impregnating a polymer matrix with an electrolyte solution wherein the ion conduction is mainly performed through the phase of the electrolyte solution.

Also the gelled polymer electrolyte has another advantage, that is, a higher physical pressure effect than that of the organic electrolyte solution on the portions where the current flows, and thus the gelled polymer electrolyte has a higher suppressive effect on the growth of the lithium dendrite.

The gelled polymer electrolytes are roughly classified into two groups according to the species of the employed polymer matrices: One is a gel of three-dimensionally cross-linked polymer formed by mixing a monomer having an acrylate terminal group with an organic electrolyte solution and polymerizing the mixture to be cured by means of an ultraviolet rays or an electron beam radiation. An example is disclosed in, for instance, U.S. Pat. No. 4,830,939, which utilizes the cured three-dimensionally cross-linked polymer as the gel. The other is a gel formed by impregnating a one-dimensional straight chain polymer such as polyethylene oxide or the like with the organic electrolyte solution.

Either of the gels demonstrates an ionic conductivity of the same degree as that of the organic electrolyte solution, The three-dimensionally cross-linked polymer gel however suffers from a disadvantage that its cross-linked point is liable to be oxidized at high voltage over 4 V and thus it has a low decomposition voltage. Therefore, the one-dimensional straight chain polymer gel is preferable as the electrolyte for the polymer battery of 4 V class which uses a positive electrode active material of $LiCoO_2$, $LiNiO_2$ or the like.

The gel obtained by impregnating a film of the one-dimensional straight chain polymer with the organic electrolyte solution demonstrates an ionic conductivity of the same degree as that of the organic electrolyte solution. The gel however cannot maintain the shape of the film because the polyethylene oxide dissolves in the electrolyte solution and flows, thereby to lose its function as a solid and decrease its mechanical strength.

By contrast, when a film made of polyvinylidene fluoride, which is one-dimensional straight chain polymer similar to the polyethylene oxide, is immersed in the organic electrolyte solution, dissolution of the polymer and its flowing are not occurred. The obtained film is swollen only slightly but functions as a gel having a self-supporting property. The ionic conductivity of the film cannot however be high enough, and the gel of polyvinylidene fluoride as disclosed in Japanese Laid-Open Patent Publication Sho 61-23947 has a low conductivity of about $10^{-5}$ S/cm at best.

Under these circumstances, for realizing practical use of the one-dimensional straight chain polymer as the polymer matrix, it is necessary to satisfy both requirements of maintaining the shape as a solid and securing an acceptable ionic conductivity at the same time. Either of the functions is deteriorated in the conventional electrolytes and thus development of such a polymer material that satisfies both of the above-mentioned two requirements at the same time has been eagerly desired.

SUMMARY OF THE INVENTION

The object of the present invention is to solve the above-mentioned problems and to provide a novel polymer electrolyte and a lithium polymer battery using the same.

The present invention provides a gelled polymer electrolyte comprising a polymer alloy and an organic electrolyte solution, wherein the polymer alloy comprises a polymer which is hardly soluble in the organic electrolyte solution and another polymer which is soluble in the organic electrolyte solution.

This polymer electrolyte can be produced as follows:

A polymer alloy film is prepared by mixing a polymer which is hardly soluble in an organic electrolyte solution and another polymer which is soluble in the organic electrolyte solution or effecting mutual dissolution of these polymers. The film thus obtained is gelled by impregnating it with the organic electrolyte solution. This gives the gelled polymer electrolyte.

In a preferred mode of the present invention, polyvinylidene fluoride or a copolymer including vinylidene fluoride, is used as the hardly soluble polymer, and polyethylene oxide is used as the readily soluble polymer.

The present invention also provides a lithium polymer battery comprising a negative electrode including an active material of lithium, a positive electrode capable of being charged and discharged, and the above-mentioned gelled polymer electrolyte placed between both electrodes.

In a preferred mode of the present invention, at least one member selected from the group consisting of metallic lithium, a lithium alloy, and carbon or an inorganic compound capable of intercalating and deintercalating lithium in a reversible manner is used as the negative electrode. In the positive electrode, at least one metal oxide, capable of intercalating and deintercalating lithium in a reversible manner, selected from the group consisting of $LiCoO_2$, $LiNiO_2$, $LiMn_2O_4$ and $Li_xMnO_2$ ($0<x<0.5$) in particular is used as its active material. The gelled electrolyte used is a gel obtained by impregnating a polymer alloy film with an organic electrolyte solution, the polymer alloy film being prepared by mixing polyvinylidene fluoride or a copolymer containing vinylidene fluoride with polyethylene oxide, or dissolving these polymers in each other.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
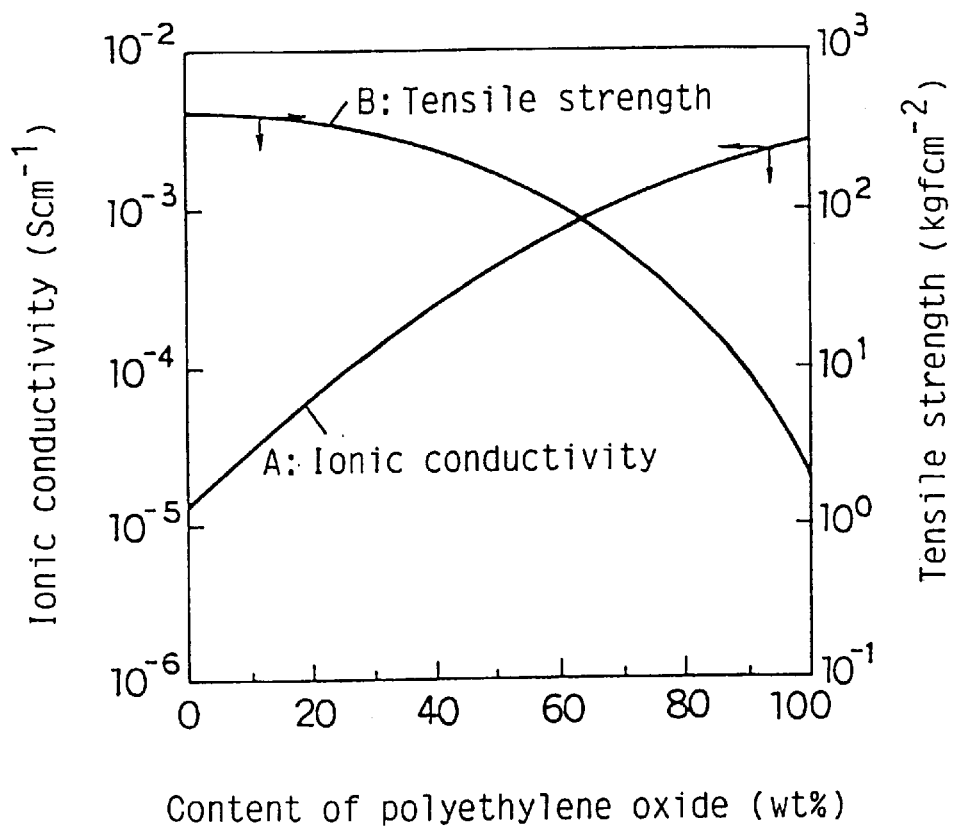
FIG. 1 is a diagram showing an ionic conductivity and a tensile strength of the gelled electrolyte prepared in accordance with the present invention.

The present invention utilizes a polymer alloy film comprising a polymer which is hardly soluble in an organic electrolyte solution such as polyvinylidene fluoride or a copolymer including vinylidene fluoride, and another polymer which is readily soluble in the organic electrolyte solution such as polyethylene oxide. These polymers are one-dimensional straight chain polymer.

The polymer alloy film can be obtained by dissolving the above-mentioned two kinds of polymers in a common solvent and then removing the solvent by evaporation. Alternatively, the polymer alloy film may be obtained by melting the two kinds of polymers at a high temperature and then rapidly cooling the molten mixture.

The obtained film is a polymer alloy wherein the two kinds of polymers A and B are mixed together or mutually dissolved. Depending on the combination of the polymers, the polymer alloy has a "sea-and-island structure" where the islands of the polymer B are dispersed in the sea of the polymer A, or an modulated structure where the polymers A and B are closely entangled with each other. In either case, the polymer alloy film appears microscopically phase-separated structure into A polymer-rich phases and B polymer-rich phases.

The structure effectively contributes to the maintenance of both the solid shape of the gelled film and the high ion-conductivity. When the polymer alloy film is immersed in the organic electrolyte solution, the electrolyte solution permeates through the polymer portions which are soluble in the organic electrolyte solution and thus these portions become gelled-state. Since the polymer which is hardly soluble in the organic electrolyte solution is entangled with the polymer which is soluble in the organic electrolyte solution, the latter polymer is fixed and will not flow. In this manner, a highly ion-conductive gelled electrolyte having a high mechanical strength is produced.

Although the employed materials differ from those of the electrolyte in accordance with the present invention, a gelled electrolyte comprising a similar one-dimensional polymer is disclosed in U.S. Pat. No. 5,296,318. The disclosed gelled electrolyte is proposed to facilitate dissolution and swelling of a polymer which is hardly soluble in the organic electrolyte solution. The gelled electrolyte is prepared by utilizing a copolymer of vinylidene fluoride with hexafluoropropylene, then dissolving the above-mentioned copolymer and an electrolyte in a volatile solvent, followed by removal of the solvent from the obtained solution.

The disclosed electrolyte is characterized by plasticization of the gel by decreasing the crystallinity of the polyvinylidene fluoride by copolymerization of the gel with hexafluoropropylene. As a result, a high ionic conductivity of $10^{-3}$–$10^{-4}$ S/cm is realized.

The gelled electrolyte in accordance with the present invention differs from the disclosed electrolyte in that the structure of the polymer serves as the matrix. The disclosed electrolyte uses a copolymer wherein the two kinds of polymers are chemically bound to each other, whereas the gelled electrolyte in accordance with the present invention employs a polymer alloy wherein the two kinds of the polymers are entangled with each other at the molecular level and are dissolved in each other. The polymer alloy is characterized in that the technical advantages inherent to the respective polymers are emphasized and reinforced, which are created by mutual dissolution of the polymers having different properties. The present invention utilizes a system comprising the previously described two kinds of polymers and makes good use of the respective technical advantages.

In the following paragraphs, the present invention will be described in more detail with reference to its specific working examples and comparative examples, as well as the attached drawings.

EXAMPLE 1

In this example, a gelled electrolyte of a polymer alloy film was prepared by mixing polyvinylidene fluoride which is a polymer hardly soluble in an organic electrolyte solution and polyethylene oxide which is a polymer soluble in the organic electrolyte solution, or dissolving them in each other.

A method for preparing the polymer alloy film is described as follows.

First, a solution of N-methyl-2-pyrrolidinone which dissolves 1–10 % by weight polyvinylidene fluoride and another solution of acetonitrile which dissolves 1–10 % by weight polyethylene oxide were prepared, and both solutions were mixed together in weight ratios in a range of 1:99 to 99:1. Next, the mixture thus obtained was spread over a metal or glass plate and the solvents in the solution were removed by evaporation in a dryer at 80° C. This gives a thin polymer alloy film. The amount of the mixture to be spread was so adjusted as to obtain a film having a thickness of 10–100 µm. The film thus obtained was further dried at 50° C. under vacuum, thereby to remove the remaining solvents and water.

Subsequently, the above-mentioned polymer alloy film was immersed in a bath filled with an organic electrolyte solution, thereby to obtain a gelled electrolyte of the polymer alloy. Used organic electrolyte solution was a solution of a mixed solvent of ethylene carbonate with ethyl methyl carbonate in a volumetric ratio of 25:75 which dissolves a solute of $LiPF_6$ at 1.0–1.5 mol/L.

COMPARATIVE EXAMPLE 1

A gelled electrolyte of a homopolymer film was prepared from polyvinylidene fluoride which is a polymer hardly soluble in an organic electrolyte solution. A procedure similar to that of Example 1 was followed except for the use of a single solution of N-methyl-2-pyrrolidinone which dissolves 1–10 % by weight polyvinylidene fluoride as the mixture.

COMPARATIVE EXAMPLE 2

Another gelled electrolyte of a homopolymer film was prepared from polyethylene oxide which is soluble in an organic electrolyte solution. A procedure similar to that of Example 1 was followed except for the use of a single solution of acetonitrile which dissolves 1–10 % by weight polyethylene oxide as the mixture.

EVALUATION

Ionic conductivity and mechanical strength of the gelled electrolytes prepared in accordance with Example 1 and Comparative Examples 1 and 2, respectively, are shown in FIG. 1.

In FIG. 1, curves A and B represent the ionic conductivity and the tensile strength of the gelled electrolyte, respectively. The left end of the abscissa in the diagram corresponds to the gelled electrolyte of the homopolymer film made of polyvinylidene fluoride of Comparative Example 1, while the right end corresponds to the gelled electrolyte of a homopolymer film made of polyethylene oxide of Comparative Example 2. The region between both ends corresponds to the gelled electrolyte of the polymer alloy.

From this diagram, it is appreciated that the gelled electrolyte of the homopolymer film made of polyvinylidene fluoride of Comparative Example 1 has a tensile strength of 400 $kgf/cm^2$, suggesting a high mechanical strength. Its ionic conductivity is however as low as $1.3 \times 10^{-5}$ S/cm below the practical level for a commercial secondary battery.

By contrast, the gelled electrolyte of the homopolymer film made of polyethylene oxide of Comparative Example 2 has an ionic conductivity of $2.8 \times 10^{-3}$ S/cm at the practical level. On the other hand, its tensile strength is 2 $kgf/cm^2$, which is extremely low, and the gelled electrolyte tends to flow. It is therefore impossible to use this gelled electrolyte unless it is carried on a matrix having a self-supporting property such as separator.

As compared with these electrolytes, the gelled electrolyte of the polymer alloy in accordance with Example 1 demonstrates both the ionic conductivity and the tensile strength; the values lie between those of Comparative Examples 1 and 2 and vary by the composition of the polymer alloy.

In order to suppress the IR (ohmic) loss during discharging process to a minimum, the electrolyte is required to have an ionic conductivity of at least $10^{-4}$ S/cm. Based on the diagram of FIG. 1, the content of polyethylene oxide in the polymer alloy film should preferably be 25% by weight or more.

The mechanical strength of the gelled electrolyte is desirably the same as that of the separator, and a tensile strength at least 100 $kgf/cm^2$ is required. Based on the diagram of FIG. 1, the content of polyethylene oxide in the polymer alloy film should preferably be 60% by weight or less.

It is concluded that the gelled electrolyte of Example 1 has the characteristics of effective compensation of the disadvantages inherent to Comparative Examples 1 and 2, while functioning as an electrolyte having a high mechanical strength and high ionic conductivity, when the content of polyethylene oxide is in a range of 25–60% by weight.

EXAMPLE 2

Figure 2:
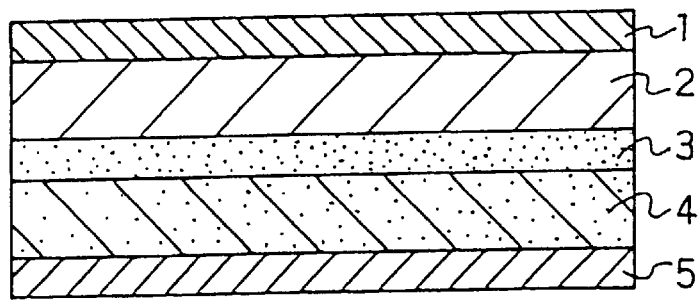
FIG. 2 is a vertical cross-sectional view of a power generating unit of a lithium battery using the gelled electrolyte prepared in accordance with the present invention.

FIG. 2 shows a vertical cross-sectional view of a power generating unit of a lithium battery in accordance with the present invention which uses the gelled electrolyte of the polymer alloy film prepared in Example 1. In FIG. 2, numeral 2 designates a negative electrode layer, configured by adhering a metallic lithium to a negative electrode current collector 1. Numeral 4 designates a positive electrode layer, configured by applying a paste composed of $LiCoO_2$, acetylene black and a binder to a positive electrode current collector 5.

Between both electrodes, the gelled electrolyte of Example 1 indicated by numeral 3 is inserted, thereby to obtain a lithium polymer battery. The polymer alloy film used here has a weight ratio of 50:50 for polyvinylidene fluoride and polyethylene oxide.

COMPARATIVE EXAMPLE 3

A lithium battery using a separator was configured. The battery was prepared by a procedure similar to that in Example 2, except for the use of a microporous membrane separator made of polypropylene in place of the gelled electrolyte film of the polymer alloy and the injection of the liquid electrolyte after assembling a group of two electrodes and one separator.

EVALUATION

Figure 3:
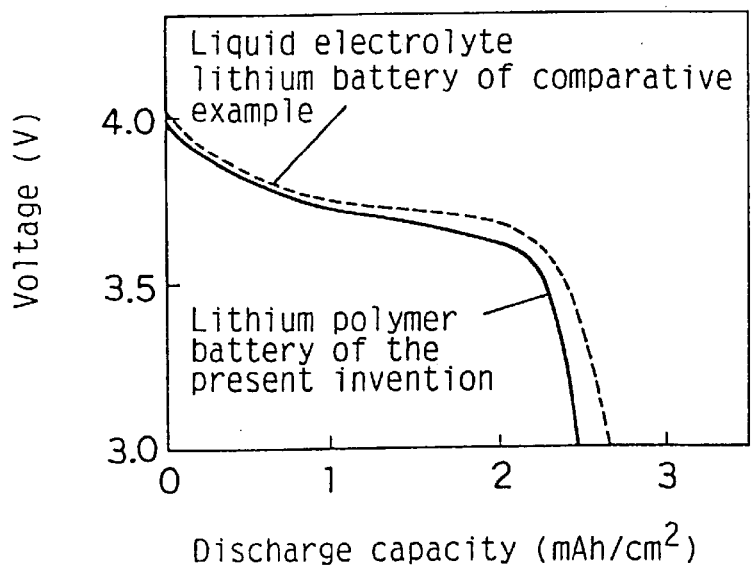
FIG. 3 is a diagram showing a discharge curve of the lithium battery using the gelled electrolyte prepared in accordance with the present invention and that of a lithium battery using a liquid electrolyte in accordance with Comparative Example.

Discharge curves at the first cycle of the batteries of Example 2 and Comparative Example 3 are shown in the diagram of FIG. 3. The discharge tests of the batteries were performed at room temperature with a constant current of 0.5 $mA/cm^2$ in a voltage range of 4.2 V to 3.0 V.

From FIG. 3, it is appreciated that the lithium polymer battery of Example 2 has a discharge capacity of 2.5 $mAh/cm^2$ or larger. This value is slightly inferior to that of the lithium battery of Comparative Example 3 comprising the liquid electrolyte but acceptable for a commercial lithium battery.

Figure 4:
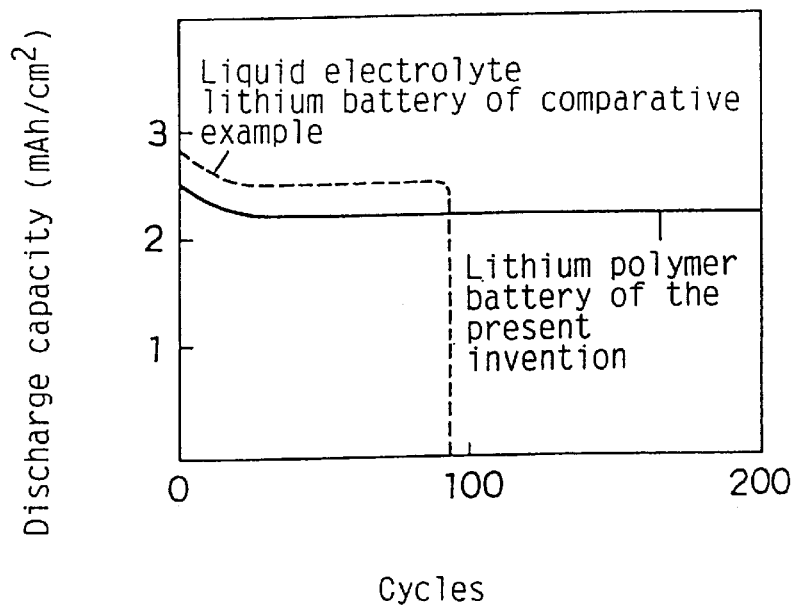
FIG. 4 is a diagram showing charge/discharge cycle characteristics of the lithium battery using the gelled electrolyte prepared in accordance with the present invention and of that using a liquid electrolyte in accordance with Comparative Example.

Charge/discharge cycle characteristics of these batteries are shown in the diagram of FIG. 4.

As seen from FIG. 4, although the lithium battery of Comparative Example 3 has a large initial discharge capacity, its capacity decreased abruptly and it failed to be charged or discharged at about 100th cycle. As a result of disassembling the battery and the subsequent observation, it was found that lithium dendrites of the negative electrode pierced through the separator and reached the positive electrode, and thus it was believed that the deterioration of the capacity was due to an internal short-circuiting.

On the other hand, the battery of Example 2 stably operated even after the 200th cycle, despite slightly small initial discharge capacity compared with that of the battery of Comparative Example 3. As a result of disassembling the battery after the 200th cycle and the subsequent observation, no piercing by the lithium dendrite was found. These results clarified that the battery in accordance with the present invention can function as a lithium secondary battery having a high safety and reliability, free from internal short-circuiting.

As additional comparative examples, a battery comprising the gelled electrolyte containing polyvinylidene fluoride as the homopolymer and another battery comprising the gelled electrolyte containing polyethylene oxide as the homopolymer were configured. As a result, it was found that there were large dispersions in the discharge capacity and the serviceable cycle number, and that the stability of the battery performance was poor. This may be because the polyvinylidene fluoride has a poor film-forming ability whereas the polyethylene oxide has a poor self-supporting property of the gelled electrolyte.

In the foregoing working examples, although polyvinylidene fluoride is used as the polymer which is hardly soluble in the organic electrolyte solution, it may alternatively be a copolymer including vinylidene fluoride, or polystyrene.

In place of polyethylene oxide which is used as the polymer soluble in the organic electrolyte solution in the above-mentioned examples, polymethylmethacrylate or polyacrylonitrile may be used with a similar technical advantage.

Although the disclosed mixing ratio is suitable for the above-mentioned working example using polyvinylidene fluoride and polyethylene oxide as the polymer hardly soluble in the organic electrolyte solution and the polymer soluble in the organic electrolyte, respectively, other mixing ratios of the materials may be used if a high mechanical strength and high ionic conductivity of the electrolyte can be secured.

In the foregoing working examples, although $LiPF_6$ is used as the solute in the organic electrolyte solution, another lithium salt may alternatively be used such as $LiCF_3SO_3$, $LiClO_4$, $LiN(CF_3SO_2)_2$, $LiAsF_6$, $LiBF_4$ or the like.

In the foregoing working examples, although a mixture of ethylene carbonate and ethylmethyl carbonate is used as a solvent in the organic electrolyte solution, another solvent may alternatively be used such as propylene carbonate, γ-butyrolactone, diethyl carbonate, dimethyl carbonate, or the like.

In place of metal lithium which is used as the negative electrode in the foregoing working examples, a lithium alloy or graphite capable of intercalating or deintercalating lithium in a reversible manner may be used with a similar technical advantage.

In the foregoing working examples, although $LiCoO_2$ is used as the positive electrode active material, any metal oxide capable of intercalating or deintercalating lithium in a reversible manner may alternatively be used. For preparing a lithium battery of 4 V class in particular, it is preferable to use one of $LiNiO_2$, $LiMn_2O_4$ and $Li_xMnO_2$ (0<x<0.5).

In addition, a method for impregnating the polymer alloy film with the organic electrolyte should not be limited to the above-disclosed method, but incorporation of the polymer electrolyte into a battery may be performed in a manner wherein the organic electrolyte is injected after the group of two electrodes and one polymer alloy film is configured and housed in a battery can with a similar technical advantage.

As described previously, according to the present invention, it is possible to prepare a polymer electrolyte which secures both of the mechanical strength and the ionic conductivity, by utilizing, as the polymer matrix for the gelled electrolyte, a polymer alloy film obtained by mixing a polymer which is hardly soluble in an organic electrolyte solution and another polymer which is soluble in an organic electrolyte solution and dissolving them in each other. In addition, by combining the gelled electrolyte with a positive and a negative electrode for a lithium battery, it is possible to produce a lithium polymer battery which demonstrates a discharge characteristic equivalent to those of the batteries in the liquid electrolyte system.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A gelled polymer electrolyte comprising a polymer alloy and an organic electrolyte solution, wherein said polymer alloy consists essentially of a polymer which is polyvinylidene fluoride or a copolymer including vinylidene fluoride and which is hardly soluble in said organic electrolyte solution, mutually dispersed in another polymer which is soluble in said organic electrolyte solution, wherein said polymer alloy is microscopically phase-separated into hardly soluble polymer-rich phases and soluble polymer-rich phases, and wherein the mutual dispersion of the polymer alloy components provides homogeneity and high ion-conductivity to the electrolyte.

2. The polymer electrolyte in accordance with claim 1, wherein said polymer which is soluble in the organic electrolyte solution is polyethylene oxide.

3. A lithium polymer battery comprising a negative electrode, a positive electrode, and a gelled polymer electrolyte placed between both electrodes, wherein said gelled polymer electrolyte comprises a polymer alloy and an organic electrolyte solution, said polymer alloy consisting essentially of a polymer which is polyvinylidene fluoride or a copolymer including vinylidene fluoride and which is hardly soluble in said organic electrolyte solution, mutually dispersed in another polymer which is soluble in said organic electrolyte solution, wherein the polymer alloy is microscopically phase-separated into hardly soluble polymer-rich phases in soluble polymer-rich phases, and wherein the mutual dispersion of the polymer alloy components provides homogeneity and high ion-conductivity to the electrolyte.

4. The lithium polymer battery in accordance with claim 3, wherein said negative electrode comprises at least one member selected from the group consisting of metallic lithium, a lithium alloy, and carbon or a compound capable of intercalating and deintercalating lithium in a reversible manner.

5. The lithium polymer battery in accordance with claim 3, wherein the active material of said positive electrode comprises at least one member selected from the group consisting of $LiCoO_2$, $LiNiO_2$, $LiMn_2O_4$ and $Li_xMnO_2$ ($0<x<0.5$).

6. The lithium polymer battery in accordance with claim 3, wherein said polymer which is soluble in the organic electrolyte solution is polyethylene oxide.

* * * * *